Figure 1:
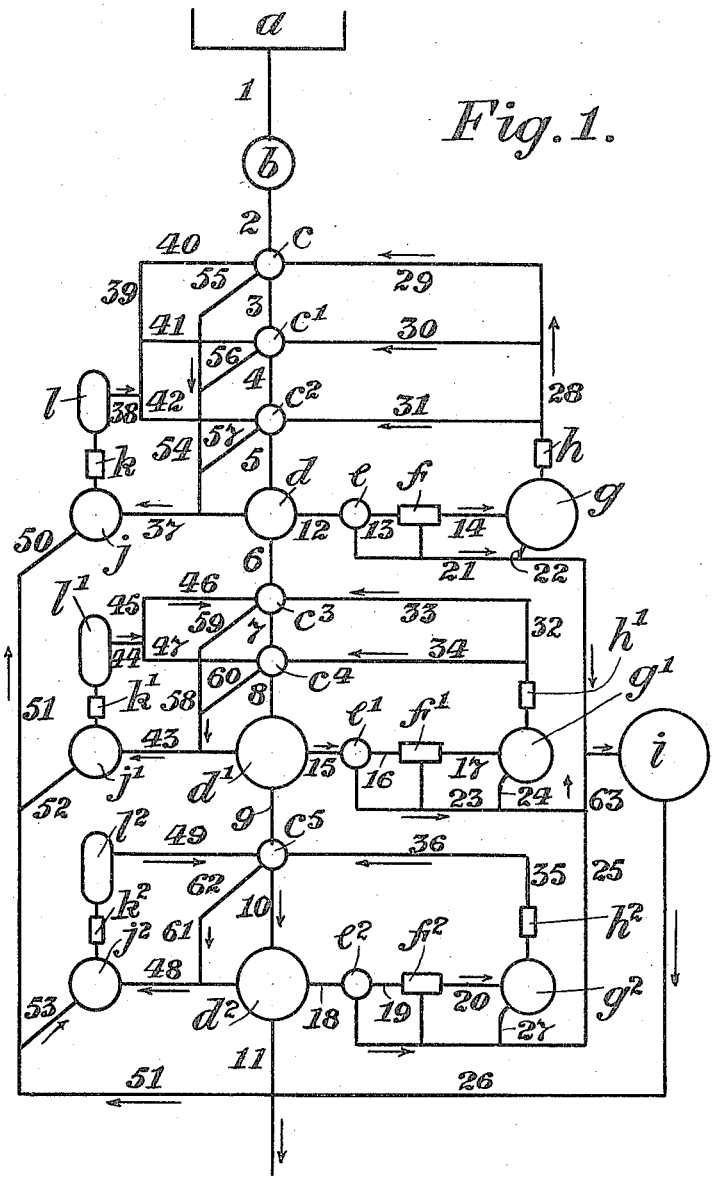

H. M. LESLIE.
TREATMENT OF ORES BY THE CYANID PROCESS.
APPLICATION FILED DEC. 30, 1911.

1,158,513.

Patented Nov. 2, 1915.
3 SHEETS—SHEET 1.

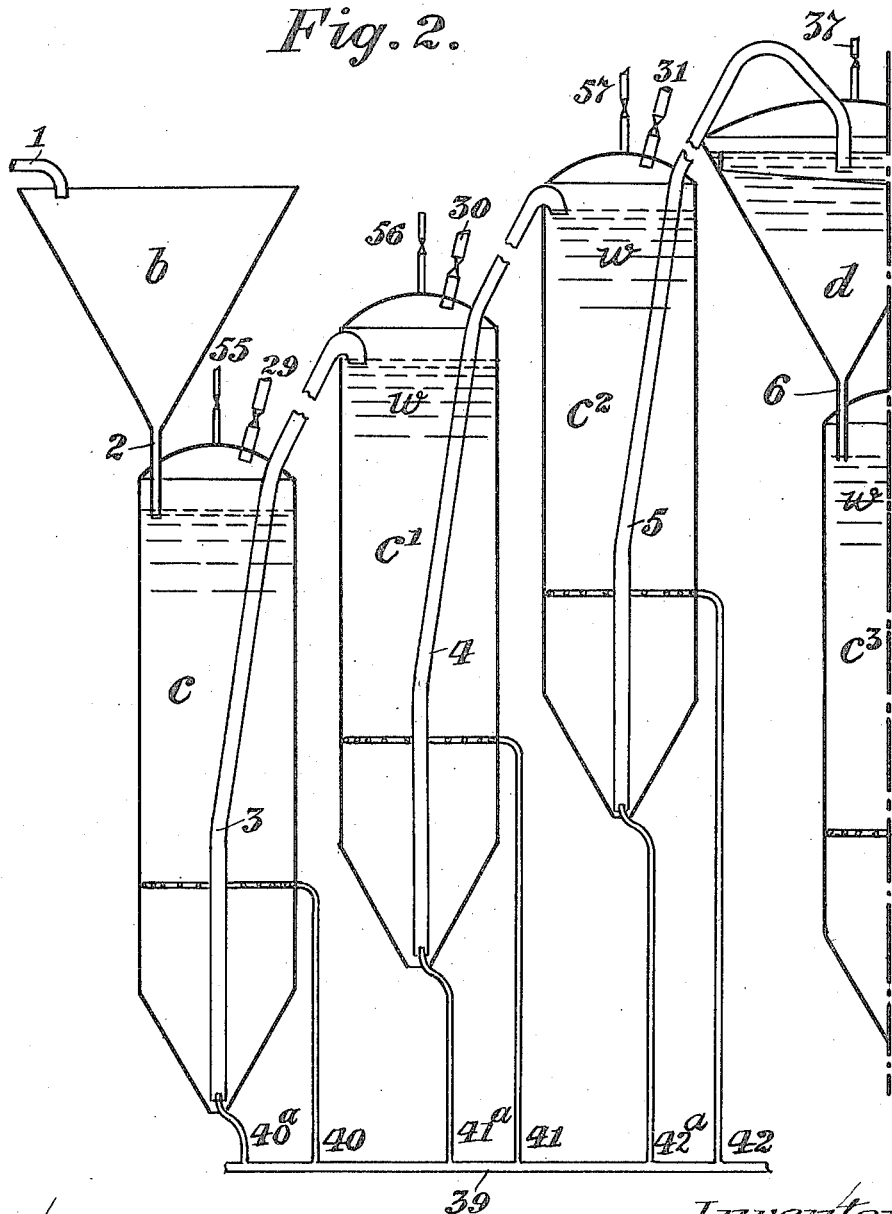

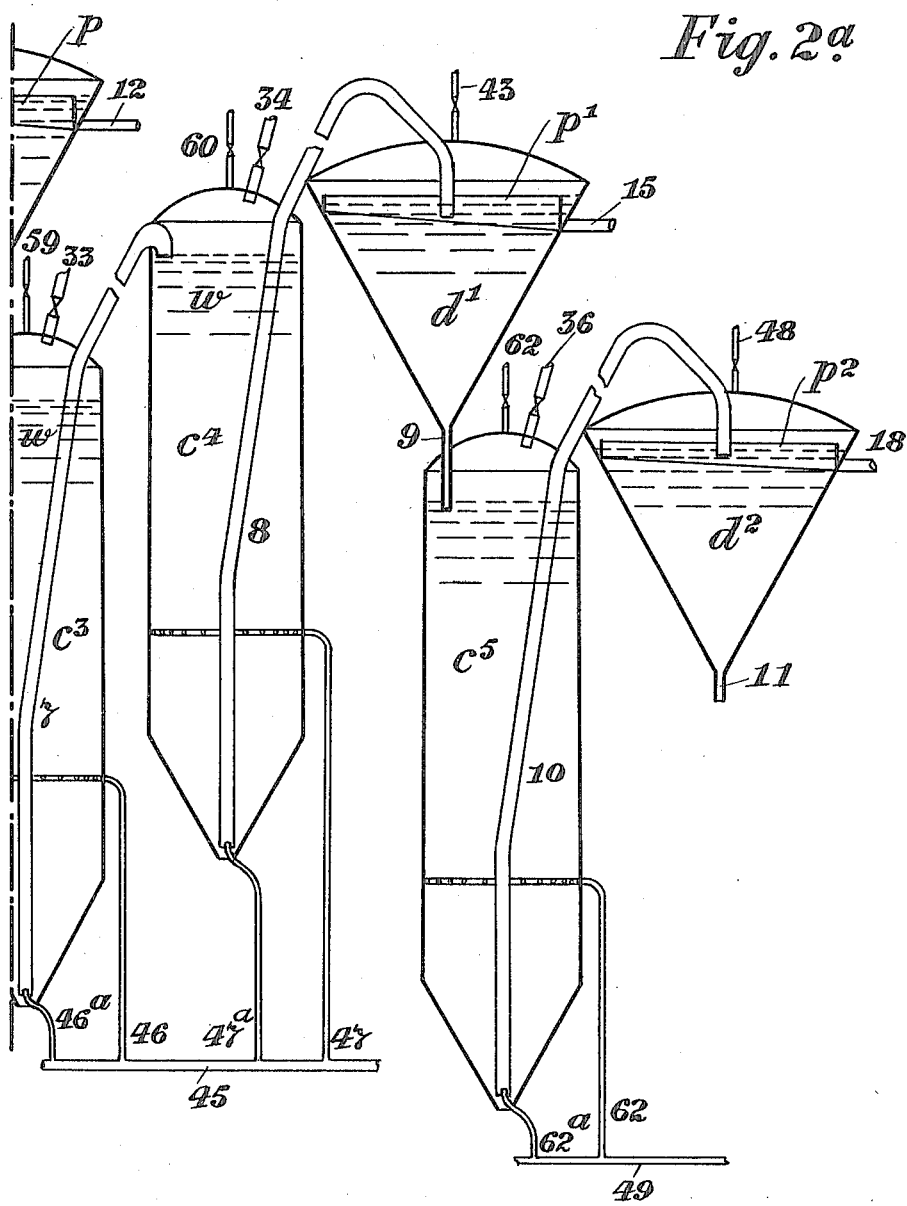
Fig. 2ª

UNITED STATES PATENT OFFICE.

HUGH M. LESLIE, OF GLASGOW, SCOTLAND.

TREATMENT OF ORES BY THE CYANID PROCESS.

1,158,513.  Specification of Letters Patent.  Patented Nov. 2, 1915.

Application filed December 30, 1911. Serial No. 668,739.

*To all whom it may concern:*

Be it known that I, HUGH MACKENZIE LESLIE, metallurgical engineer, a subject of the King of Great Britain, residing at Glasgow, Scotland, have invented certain new and useful Improvements in the Treatment of Ores by the Cyanid Process, of which the following is a specification.

In the extraction and recovery of metals from their ores by means of cyanid it is generally known that a loss of the cyanid takes place, apart from the loss which occurs in the vessels in which the ore pulp is treated, through decomposition, by various agencies, of the cyanid or cyanogen compound used, and, as a result of the decomposition, gases and vapors (mainly, hydrocyanic acid gas) containing the cyanogen radical are given off from all the vats, precipitation tanks or extractor boxes, filters, etc. used and are lost in the atmosphere. Likewise, in treating ores by the cyanid process by any of the known methods, such as agitation, percolation, or decantation, whenever the pulp, mixed with, or in contact with, a cyanogen compound, is exposed to, or is in contact with, the atmosphere a similar loss of cyanid occurs apart from the amount of this chemical actually consumed in the extraction and recovery of the metal.

The word extraction hereinafter used I apply not only to the dissolving of the metal from its ore but also to the subsequent recovery of the said metal in a marketable form from said solution.

The object of my invention is to effect great economy in the treatment of ores by sodium or potassium cyanid or other cyanogen compounds by using an improved construction and arrangement of plant in which all the cyanogen containing gases liberated during the treatment are collected and utilized over and over again in the process of extraction of the metal thereby obtaining the maximum effect at the minimum of cost.

In carrying out this invention I cover the tanks, vats, extractor boxes, machines or places where cyanogen compounds (hydrogen cyanid, potassium or sodium cyanid or other cyanid) in gas or solution are found, contained, or are used, in, or for, the process of extraction, in such manner as to prevent the said gases escaping or diffusing into the atmosphere. The gases from these covered vessels and (or) places are carried off and conducted to one or more collecting vessels (such as a gasometer or the like) and then to a compressor or pump or the like, the gases being withdrawn, as desired, from the collecting vessel (or vessels) and after being compressed by the compressor being delivered therefrom and again utilized, in conjunction with air, for agitating or aerating the ore pulp under treatment and for lifting same from vessel to vessel, the cyanogen containing gases being thereby again brought into contact with the material on which they act. As will be seen, by this a closed system the cyanogen containing gases given off during all the stages of the process of extraction are collected and then brought back and forced, under pressure, into the agitators or other vessels in which the ore pulp is being treated. This forcing of the gases, back again into the ore pulp vessels goes on, or may go on, continuously, so long as the treatment is being carried out. Of course, if so desired, the cyanogen containing gases may be collected and thereafter used as and when required. If so desired, instead of conducting the waste gases first to a collecting vessel they may be conducted directly to the compressor.

Should it be necessary to introduce a base to accelerate the process of dissolution of the metal or for the formation of a soluble cyanid or to assist the precipitation of the metal from solution in the precipitation tanks or extractor boxes, such agent can be introduced into the agitator or other vessel in which the ore pulp is undergoing treatment as may be found necessary or be added to the solution prior to its passing into the said precipitation tanks or extractors or at any other stage of the process.

In some cases instead of forcing the cyanogen containing gases into the agitators or other vessels containing the ore pulp the gases may be sucked into and through the pulp by means of a suction pump or other suitable suction appliance.

Theoretically about 4.5 lbs. of cyanid should dissolve about 100 ozs. of gold but, in actual practice, it is found that nearly forty times this quantity is required. Owing to the great loss which takes place it is usual, at present, to increase the strength of the working solutions, from time to time, by the addition thereto of fresh cyanid. Now, under my system, the gases evolved during the whole process are collected and again passed into contact with the material and if an alkaline solution is added thereto from time to time then the hydrocyanic acid in such gases will combine with the alkali and give the same effect as if fresh cyanid were added, thereby, to a great extent, obviating the necessity for such additions of cyanid.

Hydrocyanic acid can be safely used for treating gold tellurid and other ores, and ammonium cyanid for treating, say, silver ores with very effective and economical results.

A feature of the system is that the agitators and dewatering cones of each group of the same are so arranged that the pulp is gradually raised step by step by means of an air lift, the gases collected being introduced to the agitators with the air at each lift and thereby effectively acting on the pulp.

In order that the invention may be clearly understood I have, by way of illustration or example, shown at Figures 1 and 2—2ª of the drawings annexed, a suitable construction and arrangement of plant for carrying out the complete cyanid process according to my closed system.

Fig. 1 is a diagram giving a plan view of the plant and Figs. 2—2ª is an elevation of the series of agitators.

Under my invention the pulp from the mill $a$ passes by means of a conduit 1 to a dewatering cone $b$ where the surplus water is removed and the pulp thickened for treatment. The pulp passes onward by pipe 2 to an agitator $c$ and, in turn, from this agitator $c$ to a second agitator $c^1$, a third agitator $c^2$ and a second dewatering cone $d$ from whence by pipe 6 it is delivered to a fourth agitator $c^3$ then to a fifth agitator $c^4$ and to a third dewatering cone $d^1$ and from this, again, it may be delivered by pipe 9 to a sixth agitator $c^5$ and a final dewatering cone $d^2$. The pulp is lifted step by step from agitator to agitator (or dewatering cone) by means of lift pipes 3, 4, 5, 7, 8, 10, and (in conjunction with cyanogen containing gases evolved during the process) compressed air is used for giving each lift, the compressed air being supplied from compressed air mains 39, 45 and 49 to pipes 40ª, 41ª, 42ª, 46ª, 47ª, and 62ª, these latter pipes projecting into the lower ends of the lift pipes 3, 4, 5, 7, 8, 10, and forcing the pulp up through these pipes. As will be seen at Fig. 2, the agitators are arranged in step formation and the pulp is gradually raised from the agitator $c$ to the cone $d$, from the agitator $c^3$ to the cone $d^1$ and from the agitator $c^5$ to the cone $d^2$. The pulp is agitated and aerated within each agitator by means of perforated air pipes therein and which communicate with air supply pipes 40, 41, 42, 46, 47 and 62. The pulp in the agitators $c, c^1, c^2$, is acted on by strong solutions of cyanid supplied through solution pipes 29, 30, and 31 which latter communicate, by the pipe 28, with the solution pump $h$ and sump $g$. The pulp, after circulating through the agitators $c, c^1, c^2$, is delivered to the dewatering cone $d$ where the surplus solution flows over the baffle $p$ and runs off by the pipe 12 to the filter tank $e$ and thence by pipe 13 to the extractor $f$ (where the dissolved metal is removed) and thence, by means of the pipe 14, to the sump $g$ ready for use over again. The thickened pulp from the cone $d$ passes, by the pipe 6, to the agitator $c^3$, and by lift pipe 7 to agitator $c^4$, these agitators being each supplied with a weak solution of cyanid through pipes 33 and 34 which latter are connected, by a pipe 32, to a solution pump $h^1$ and a sump $g^1$. From the agitator $c^4$ the pulp passes to the dewatering cone $d^1$, the surplus weak solution flowing over the baffle $p^1$ and passing away by the pipe 15 to a filter $e^1$ and then, by a pipe 16, to an extractor box $f^1$ (where any metal is removed) and then, by the pipe 17, to the sump $g^1$ ready for reuse in the same manner as the strong solution. The thickened pulp from the cone $d^1$ passes, by pipe 9, to the agitator $c^5$ where it is agitated in conjunction with water or very weak solution supplied through the pipe 36 communicating with the pipe 35 pump $h^2$ and sump $g^2$. The pulp from the agitator $c^5$ passes to the dewatering cone $d^2$ the surplus water flowing over the baffle $p^2$ and passing by the pipe 18 to a filter $e^2$ and by pipe 19 to the extractor box $f^2$ (where any metal still left is extracted) the solution thereafter passing, by the pipe 20, to the sump $g^2$. The thickened pulp and sand in the cone $d^2$ may be discharged by the pipe 11 on to the dump or it may be further dewatered by filter pressing, or otherwise, if it is thought desirable to do so.

Instead of the dewatering cones $d, d^1, d^2$, any other well known and suitable dewatering apparatus may be used and these dewaterers may be introduced after any of the agitators as is found most suitable for the ore under treatment. The number of agitators and dewaterers would be arranged to suit the requirements of the ore under treatment.

All the various agitators, dewatering cones, filters, extractor boxes, and sumps are covered over and the air charged with hydrocyanic acid from these various places passes to gasometers $i, j, j^1, j^2$. The first series of agitators have gas connections 55, 56, 57, 54, leading to a gas main 37 communicating with the gasometer $j$. The second series of agitators have likewise pipes 59, 60 and 58 leading to a gas main 43 communicating with the gasometer $j^1$. The sixth agitator $c^5$ has gas pipes 62, 61, communicating with a gas main 48 leading to the gasometer $j^2$. The dewatering cones $d$, $d^1$, $d^2$, have also gas pipes connecting with the mains 37, 43, and 48, as shown, so that the cyanogen containing gases evolved during the process are carried away by these various pipes to the gasometers $j$, $j^1$, $j^2$. Further, the filters $e$, $e^1$, $e^2$, the extractor boxes $f$, $f^1$ and $f^2$, and the sumps $g$, $g^1$, $g^2$, are also covered over and provided with gas pipes for carrying away the gases evolved to a main gasometer $i$ by means of the various pipes 21, 22, 23, 24, 25, 26, 27 and 63. This main gasometer $i$ is connected by the pipe 51 and branches 50, 52, 53, with the gasometers $j$, $j^1$, $j^2$.

The air and gas in the gasometers can be drawn off, as required, by means of the compressors $k$, $k^1$, $k^2$, and forced into the receivers $l$, $l^1$, $l^2$, and thence by means of the pipe connections 38, 44, and 49 to the air mains 39, 45 and the various agitators the gas passing into the agitators in conjunction with the air lift and also through the perforated agitator pipes 40, 41, 42, 46, 47 and 62, thereby effectively acting upon the pulp in the agitators. In this manner the cyanogen containing gases evolved during the process are used over and over again so long as the treatment lasts. At the initial start of the process the gasometers will be supplied with air alone but as the process continues the air becomes gradually more and more charged with hydrocyanic acid and, as the strength of this acid increases, then the strength of the cyanid solutions introduced into the agitators can be lessened. The cyanid for strengthening the solutions may, as usual, be added at the sumps. Atmospheric air for use in the process may be admitted to the compressors $k$, $k^1$, $k^2$, as required a valve arrangement being provided for this purpose.

$w$ wherever repeated indicates pulp level.

It will be seen from the foregoing that the whole system is a constantly circulating one and that neither the air used nor the gases evolved during the process are allowed to escape into the atmosphere.

The plant is so arranged, as will be seen, that any one of the series of agitators may be cut out and for this purpose the pipes are supplied with suitable cocks.

Having now fully described my invention what I claim and desire to secure by Letters Patent is:—

1. The closed circulatory cyanid process for the treatment of ores for the extraction of metals, consisting in effecting the treatment in stages, the first stage consisting in continuously bringing the ore pulp into contact with cyanid solution, then agitating the same, then conveying the same to the second stage which consists in removing surplus solution and then transferring the residue, from which such surplus solution has been removed, to the third stage which consists in treating same with a weaker cyanid solution, then agitating same and then conveying same to the fourth stage which is a repetition of the second stage, the process further consisting in collecting the liquid removed at the second and fourth (dewatering) stages, extracting the metal therefrom and re-using same as required throughout the process, and also in collecting the whole of the cyanogen containing gases evolved during all stages of the process and re-using same in conjunction with air to agitate the ore pulp and convey same from stage to stage.

2. The closed circulatory process for the treatment of ores for the extraction of metals, consisting in effecting the treatment in stages, the first stage consisting in continuously bringing the ore pulp into contact with cyanid solution, then agitating the same, then conveying the same to the second stage which consists in removing surplus solution and then transferring the residue, from which such surplus solution has been removed, to the third stage which consists in treating same with a weaker cyanid solution, then agitating same and then conveying same to the fourth stage which is a repetition of the second stage, then conveying the residue, from which further solution has been removed, to the fifth stage, which is a repetition of the third stage, and then conveying same to the sixth stage, which is also a repetition of the second stage, the process further consisting in collecting the liquid removed at the second and fourth and sixth (dewatering) stages, extracting the metal therefrom and reusing same as required throughout the process, and also in collecting the whole of the cyanogen containing gases evolved during all stages of the process and re-using same in conjunction with air to agitate the ore pulp and convey same from stage to stage.

3. The closed circulatory cyanid process for the treatment of ores for the extraction of metals, consisting in effecting the treatment in stages, the first stage comprising the steps of treating the ore pulp with cyanid solution, then agitating the same to admit the solution into intimate contact therewith, and then conveying the same, by means of air under pressure, to the second stage which consists in removing surplus solution; the process consisting further in collecting the cyanogen containing gases evolved during both stages of the process and using same, in conjunction with air under pressure to convey further pulp to the second stage of the process.

4. The closed circulatory cyanid process for the treatment of ores for the extraction of metals, consisting in effecting the treatment in stages, the first stage comprising the steps of treating the ore pulp with cyanid solution, then agitating same with air under pressure to admit the solution and air into intimate contact therewith, and then conveying the same, by means of air under pressure, to the second stage which consists in removing surplus solution; the process consisting further in collecting the whole of the cyanogen containing gases evolved during both stages of the process, compressing same, and using same, in conjunction with air under pressure, to convey further pulp to the second stage of the process.

5. The closed circulatory cyanid process for the treatment of ores for the extraction of metals, consisting in effecting the treatment in alternate stages, one stage comprising the steps of treating the ore pulp with cyanid solution, then agitating same with air under pressure to admit the solution and air into intimate contact therewith and then conveying the same, by means of air under pressure, to the other stage which consists in removing surplus solution; the process consisting further in collecting the whole of the cyanogen containing gases evolved during both stages of the process, compressing same, and using same, in conjunction with air under pressure, to convey further pulp to the second mentioned stage of the process.

6. The closed circulatory cyanid process for the treatment of ores for the extraction of metals, consisting in effecting the treatment in stages, the first stage comprising the steps of treating the ore pulp with cyanid solution then agitating same with compressed air to admit the solution and air into intimate contact therewith, and then conveying same, by means of air under pressure, to the second stage which consists in removing surplus solution; the process consisting, further, in collecting the whole of the cyanogen containing gases evolved during both stages of the process and using same, in conjunction with air under pressure, partly to agitate further pulp and partly to convey same to the second stage of the process.

In testimony whereof I affix my signature in presence of two witnesses.

HUGH M. LESLIE.

Witnesses:
MARGARET FINDLAY YOUNG,
H. D. FITZ MICHIEL.

Copies of this patent may be obtained for five cents each, by addressing the "Commissioner of Patents, Washington, D. C."